United States Patent [19]

Bobeck et al.

[11] 3,713,120

[45] Jan. 23, 1973

[54] MAGNETORESISTANCE DETECTOR FOR SINGLE WALL MAGNETIC DOMAINS

[75] Inventors: Andrew Henry Bobeck, Chatham; Frank John Ciak, Roselle Park; Walter Strauss, Summit, both of N.J.

[73] Assignee: Bell Telephone Laboratories, Incorporated, Murray Hill, Berkeley Heights, N.J.

[22] Filed: April 3, 1972

[21] Appl. No.: 240,651

[52] U.S. Cl. ..340/174 EB, 340/174 TF, 340/174 SR

[51] Int. Cl. ..........................G11c 21/00, G11c 11/14

[58] Field of Search ...................340/179 TF, 174 EB

[56] References Cited

UNITED STATES PATENTS

| | | | |
|---|---|---|---|
| 3,609,720 | 9/1971 | Strauss | 340/174 TF |
| 3,680,066 | 7/1972 | Copeland | 340/174 EB |

OTHER PUBLICATIONS

IBM Technical Disclosure Bulletin; Vol. 14; No. 7 December 1971 pg. 2139.

IBM Technical Disclosure Bulletin; Vol. 14; No. 7 December 1971 pg. 2,218–2,219.

*Primary Examiner*—James W. Moffitt
*Attorney*—R. J. Guenther et al.

[57] ABSTRACT

A relatively large output signal is achieved from an expanded magnetic domain by a relatively long magnetoresistance element in the path of the domain. The relatively long element is formed with a minimum loss of space by including within the magnetoresistance element portions of the already present magnetic elements which define the path along which the domain moves. Domain movement and expansion is due to the geometry of the path-defining elements and is responsive to a magnetic field rotating in the plane of domain movement.

9 Claims, 3 Drawing Figures

MAGNETORESISTANCE DETECTOR FOR SINGLE WALL MAGNETIC DOMAINS

FIELD OF THE INVENTION

This invention relates to magnetic storage arrangements and more particularly to magnetoresistance devices for single wall magnetic domains.

BACKGROUND OF THE INVENTION

Our copending application Ser. No. 201,755, filed Nov. 24, 1971 describes a magnetoresistance device for detecting a single wall domain, locally expanded into a strip, in a detector stage of a domain propagation channel. Expansion of the domain is due to the geometry of the channel defining elements and is operative in response to a magnetic field reorienting (viz., rotating) in the plane of the layer in which the domain is moved. Once detected, a domain typically is reduced in size by those elements for continued operation.

The pattern of channel-defining elements, so operative, is designated "fine grained" and is described in copending application Ser. No. 160,841, filed July 8, 1971 for A. H. Bobeck and H. E. D. Scovil. Fine grained patterns include elements spaced apart about a distance equal to a domain diameter and permit the movement of strip domains as well as cylindrical domains (bubbles) along the channel.

A representative fine grained element is of V-shaped or chevron geometry. Each stage in the channel includes a like number of these elements. But in consecutive stages preceding and following a detector stage, the number of elements first increases and then decreases respectively. The domain likewise expands laterally and then shrinks, reaching a maximum at the output (or detector) stage.

A magnetoresistance element interconnects the apices of all the chevron elements in the detector stage and exhibits an output signal which is a function, inter alia, of the length of the magnetoresistance element. Consequently, the greater the number of elements in the detector stage, the larger the signal. But there is a limit to the amount of space that can be allocated economically to accommodate the additional elements in a detector stage and in the stages preceding and following the detector stage.

The problem thus is to make the magnetoresistance element relatively long for a given number of chevron elements in a detector stage.

BRIEF DESCRIPTION OF THE INVENTION

The invention is based on the realization that the fine grained channel-defining elements as well as the magnetoresistance element may be of like magnetically soft material and of like thickness. Consequently, portions of the channel-defining elements can be incorporated into the magnetoresistance element in order to increase the effective length of that element. For a chevron pattern, the magnetoresistance element, instead of interconnecting the apices of the chevrons, comprises, in an illustrative embodiment, consecutive portions offset from one another to alternative sides of an axis through the apices. Portions of consecutive chevron elements interconnect adjacent ones of those offset portions to produce a relatively long continuous element. For a given length of an imaginary reference magnetoresistance element through that axis, the effective length of the element is increased by the sum of the lengths of paths through those portions of the chevron elements now included as part of the magnetoresistance element.

DETAILED DESCRIPTION

Figure 1:
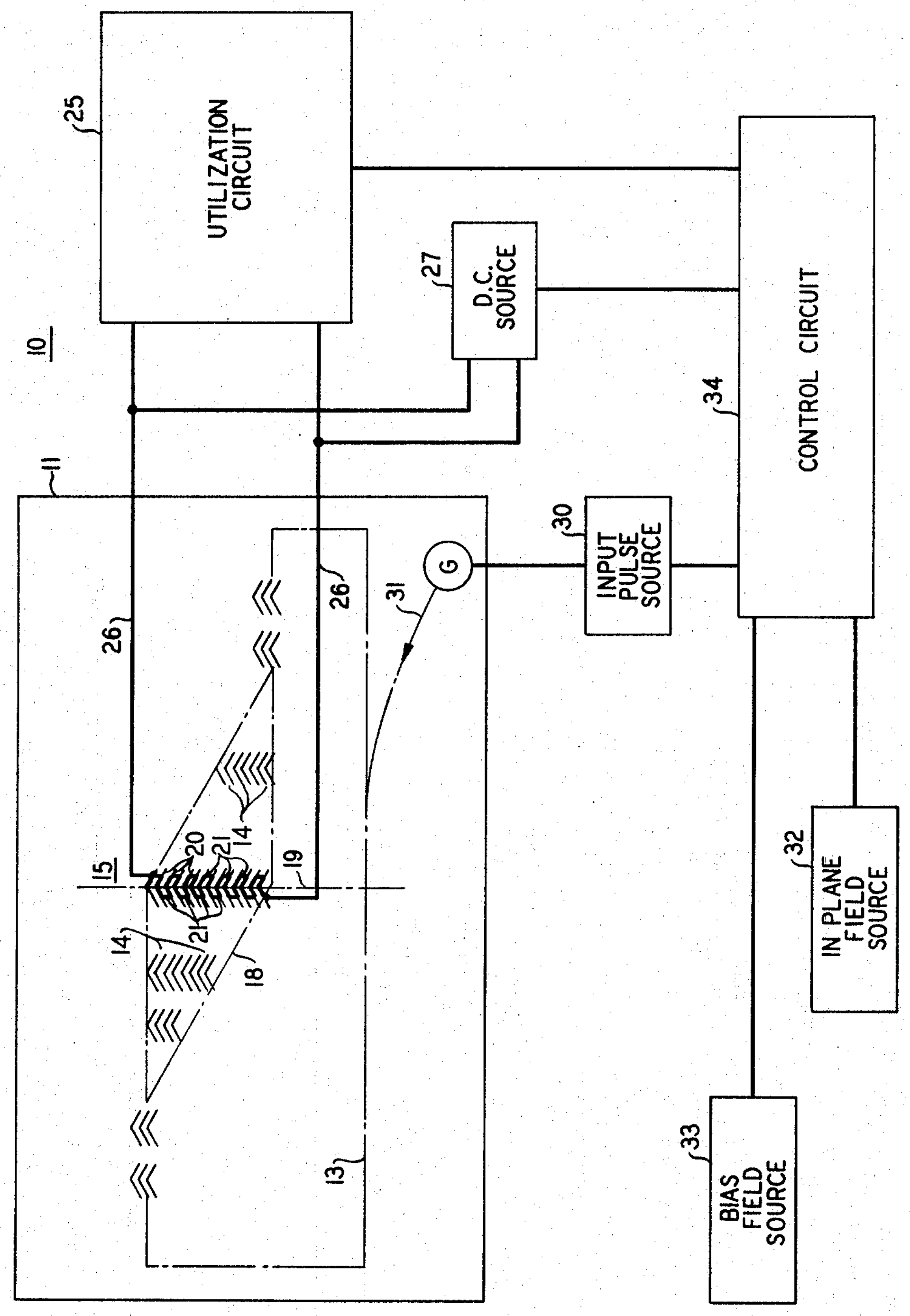
FIG. 1 is a schematic representation of a single wall domain arrangement including a magnetoresistance detector in accordance with this invention.

FIG. 1 shows a single wall domain arrangement 10 including a layer 11 in which single wall domains can be moved. An illustrative chevron pattern defines a closed loop channel 13 for recirculating domains in an assumed clockwise direction thereabout.

The chevron pattern comprises a number of elements 14, typically three, in each stage. That number increases gradually typically to more than an order of magnitude increase in a detector stage designated by 15 in FIG. 1. A domain moving in channel 13 expands laterally in a manner to follow the increased number of elements in each particular stage for a given normal operating bias field which maintains a nominal domain diameter in layer 11.

Typically the stages preceding detector stage 15 and those following that stage include first increasing and then decreasing numbers of elements to effect gradual expansion and shrinking of a domain respectively. FIG. 1 indicates the gradual expansion and decrease in the number of elements by the imaginary envelope 18 outlining the lateral boundaries of the stages to either side and including detector stage 15.

Figure 2:
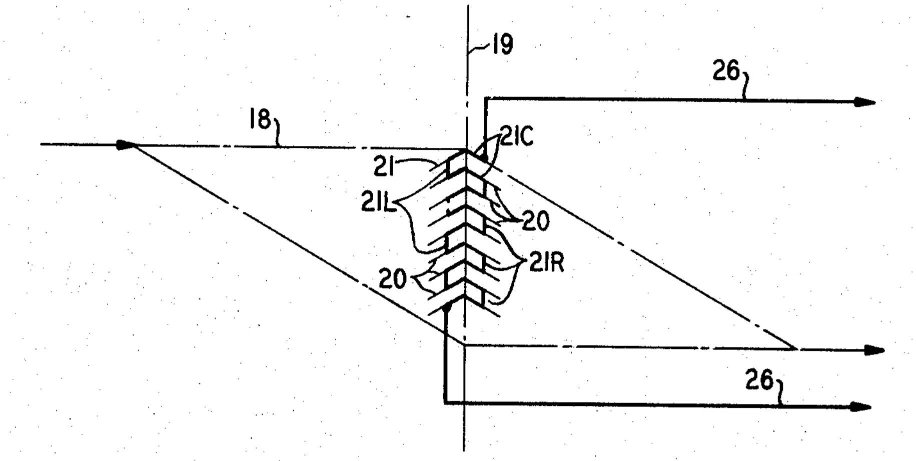
FIG. 2 is a schematic representation of the detector portion of FIG. 1; and, FIG. 3 is a schematic representation of an alternative detector for the arrangement of FIG. 1.

The axis of stage 15 is indicated by broken line 19 through the apices of the chevron elements 20 in that stage. FIG. 2 shows an expanded view of those elements. The magnetoresistance element interconnecting and including portions of those elements (20) is designated 21 and is shown darkened in the Figure for emphasis only. Note that the element includes vertical portions to the left and right of axis 19 as well as portions of the chevron elements interconnecting the vertical portions. The portions to the left are designated 21L; those to the right 21R. The portions of the chevron elements included as part of the magnetoresistance element are designated 21C. The length of the resulting magnetoresistance element is the length of the left portions, the length of the right portions plus the length of the included portions of the chevron elements. Thus, for any given number of chevron elements, a magnetoresistance element in accordance with this invention has a length greater than a reference magnetoresistance element through the apices of the chevron elements by the length of the portions of the chevron elements now included within it.

An examination of the dimensions involved gives some insight into the benefits achieved in accordance with this invention. For a typical magnetic material 11, for example, YGmTm iron garnet, 5 micron domains are moved in a bias field of 80 oersteds under the influence of a rotating field of 30 oersteds. A suitable fine grained chevron pattern includes elements 2 by 0.4 microns on 5 micron centers (lateral spacing), three to a stage. Within envelope 18 of FIG. 1, the number of elements increases to 50 over 25 stages and then decreases again to three elements. The lateral dimension of stage 15 (along axis 19) accordingly is 250 microns. But a magnetoresistance element including a portion of each chevron element in stage 15 has an effective length of 650 microns, the included length of each element 21 being 8 microns. The result is a corresponding increase in an output signal applied to utilization circuit 25 of FIG. 1 along leads 26 in response to a dc signal applied by source 27 of FIG. 1. Signals of about three millivolts have been achieved in circuits of this type operated at about 100 kilocycles at a dc level of 5 milliamperes. This output is almost half an order of magnitude larger than those achieved by a reference magnetoresistance element interconnecting the apices of the elements 21 in a similar environment.

Domains detected at stage 15 are introduced at a generator G in FIG. 1 in response to an input signal supplied by an input pulse source represented by block 30 of FIG. 1. Domains so generated advance along an auxiliary track (or channel) 31 for entrance into channel 13 in response to a magnetic field rotating in the plane of layer 11. A suitable rotating field is supplied by an inplane field source represented by block 32 of FIG. 1. Domains so moved are maintained at a nominal diameter by a bias field supplied by a source represented by block 33 of FIG. 1.

Circuit 25 and sources 27, 30, 32, and 33 are connected to a control circuit 34 for synchronization and activation. The various sources and circuits may be any such elements capable of operating in accordance with this invention.

The rotating field which advances domains along channel 13 of FIG. 1 introduces "signals" into the magnetoresistance element. These signals can be reduced to negligible levels by inclusion of the magnetoresistance element into a bridge arrangement as is well understood in the art.

Figure 3:
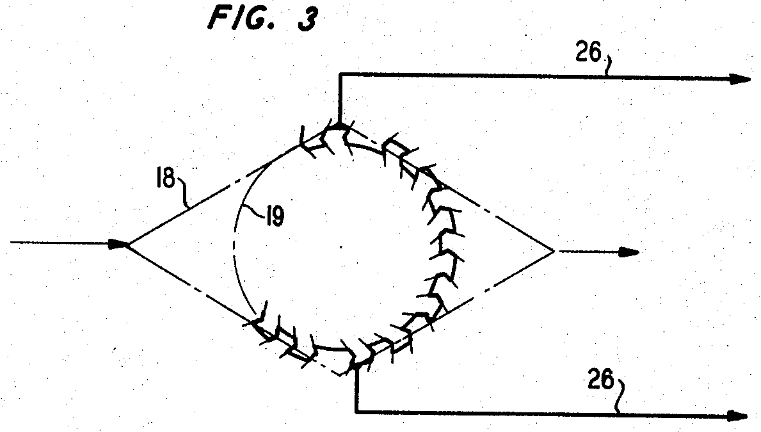

An alternative arrangement is described in a copending application of A. H. Bobeck, Ser. No. 230,755, filed Mar. 1, 1972. In that application, the elements in a detector stage of the type shown in FIG. 1 have their apices aligned along an axis 19 which forms a circle as shown in FIG. 3. In configurations of the type shown here, the signal from the in-plane field is reduced to a dc level which is negligible. In addition, the benefits of a magnetoresistance element with offset portions interconnected by portions of channel-defining elements in accordance with this invention inure.

The foregoing discussion assumes that a domain is operative over the entire length of the magnetic resistance element at once. This, however, need not be the case. It may be that a domain is of insufficient width to be so operative. In the latter case, a domain moving into a detector stage herein produces in the magnetoresistance element an output related to the left or the right vertical portions of the element as viewed in FIG. 2. In addition, the movement of a domain, to the right as viewed in FIG. 2, from the area of the left vertical portions to the area of the right vertical portions produces an output related to the portions of the chevron elements interconnected into the magnetoresistance element. Be this as it may, relatively large output signals appear to be produced by the structure regardless of the width of the domain.

The discussion, also, is in terms of a magnetoresistance element disposed symmetrically with respect to the axis through the apices of chevron elements. This need not be the case either. The magnetoresistance element may be disposed entirely to one side of that axis with little adverse effect on the output signal except for the timing thereof with respect to the phase of the inplane field.

What has been described is considered merely illustrative of the principles of this invention. Therefore, various modifications in accordance with those principles can be devised by one skilled in the art within the spirit and scope of this invention.

What is claimed is:

1. An arrangement comprising a layer of material in which single wall domains can be moved, means for moving domains along a channel in said layer, said means comprising a fine grained pattern of elements and defining a detector stage in said channel where a domain moved therein expands along an axis extending laterally with respect to the axis of said channel, and a magnetoresistance element including consecutive portions along said lateral axis offset from one another and interconnecting alternative pairs of the elements in said detector stage for including portions of said elements within said magnetoresistance element.

2. An arrangement in accordance with claim 1 wherein said pattern of elements comprises magnetically soft chevron shaped elements.

3. An arrangement in accordance with claim 2 wherein said axis extending laterally passes through the apices of said chevron elements and said consecutive portions are disposed symmetrically to either side of said axis.

4. An arrangement in accordance with claim 2 also including means for providing a magnetic field reorienting in the plane of said layer.

5. An arrangement in accordance with claim 2 wherein said elements in said detector stage are aligned along a first axis transverse to the axis of domain movement.

6. An arrangement in accordance with claim 5 wherein said first axis is a linear axis perpendicular to said axis of domain movement at said detector stage.

7. An arrangement in accordance with claim 5 wherein said first axis follows a circular path.

8. An arrangement in accordance with claim 6 also including means interconnecting said magnetoresistance element for deriving a signal therefrom indicative of the presence of a domain in said detector stage.

9. An arrangement in accordance with claim 7 also including means interconnecting said magnetoresistance element for deriving a signal therefrom indicative of the presence of a domain in said detector stage.

* * * * *